Oct. 6, 1925.  
J. W. BERNBAUM  
1,555,936  
CARLINE CONSTRUCTION  
Filed June 1, 1920
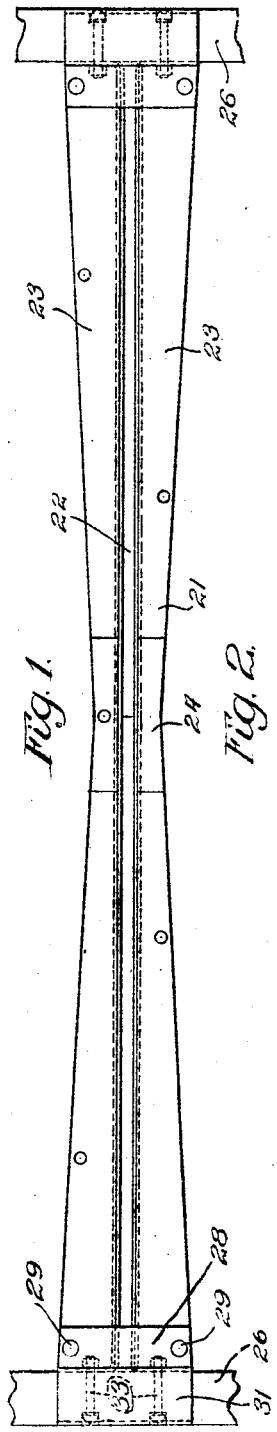
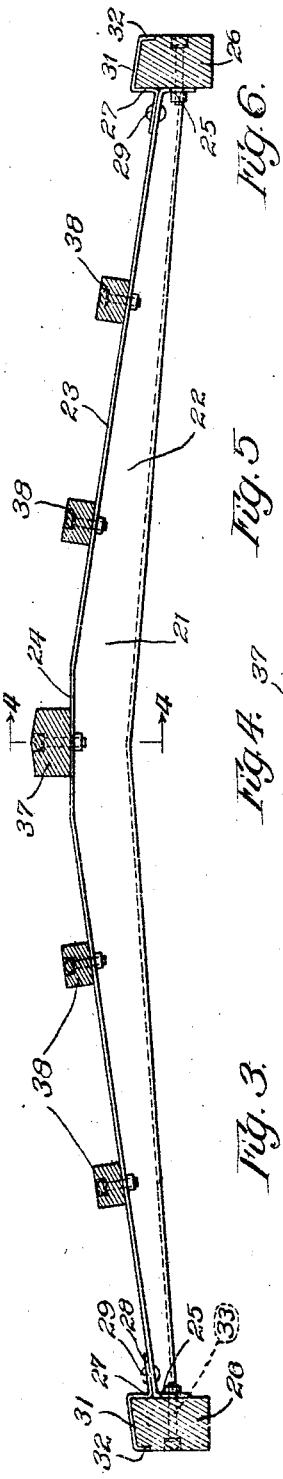
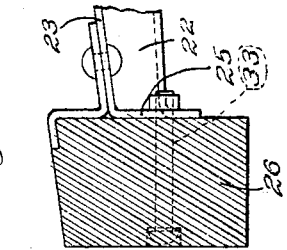
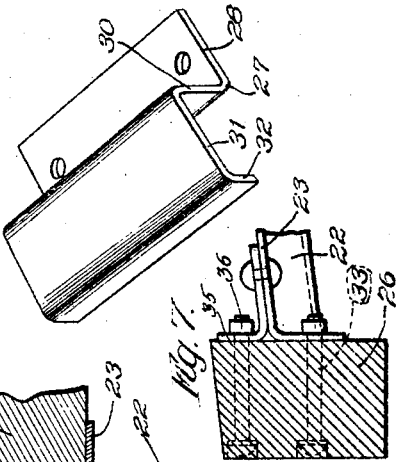
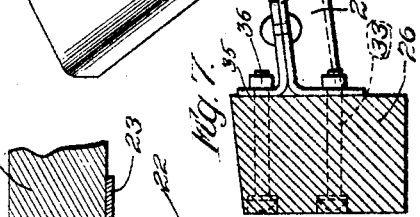
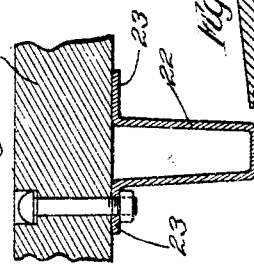
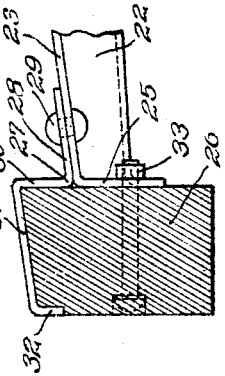
Inventor:  
John W. Bernbaum  
By: Munday Clarke & Carpenter  
his Attys.

Patented Oct. 6, 1925.

1,555,936

UNITED STATES PATENT OFFICE.

JOHN W. BERNBAUM, OF CHICAGO, ILLINOIS, ASSIGNOR TO CHICAGO-CLEVELAND CAR ROOFING COMPANY, OF WILMINGTON, DELAWARE, A CORPORATION OF DELAWARE.

CARLINE CONSTRUCTION.

Application filed June 1, 1920. Serial No. 385,460.

*To all whom it may concern:*

Be it known that I, JOHN W. BERNBAUM, a citizen of the United States, residing in Chicago, in the county of Cook and State of Illinois, have invented a new and useful Improvement in Carline Constructions, of which the following is a specification.

This invention relates to carline constructions, such as are more particularly designed for use in freight car roof frames; the invention has for an object the provision of a simply constructed well-balanced carline that is not only strongly braced in its middle portion, but also is especially reinforced at the points of attachment to the side frame members or side plates, with the result that the carline, as a whole, is stiffened and made especially resistant at the points where vertical, horizontal and torsional stresses are most likely to occur.

In addition to the general object recited above, the invention includes among its objects such other improvements and advantages in construction and operation as are found to obtain in the structures and devices hereinafter described or claimed.

In the accompanying drawings, forming a part of this specification, and showing, for purposes of exemplification, a preferred form and manner in which the invention may be embodied and practiced, but without limiting the claimed invention specifically to such illustrative instance or instances:

Figure 1 is a plan view of a portion of a car roof frame provided with a carline constructed in accordance with the present improvements;

Fig. 2 is a transverse section through the car roof, showing the carline in longitudinal elevation;

Fig. 3 is an enlarged fragmentary view of the end portion of the carline adjacent to the side plate and showing the mode of attachment thereto;

Fig. 4 is an enlarged vertical section on the line 4—4 of Fig. 2;

Fig. 5 is a perspective of the top reinforcing plate;

Fig. 6 is a view similar to Fig. 3, but illustrating a modification; and

Fig. 7 is another view similar to Fig. 3, but illustrating a further modification.

The same characters of reference indicate the same parts throughout the several views of the drawings.

In all forms of the invention shown, the carline 21 consists of a single steel bar, of channel or U-shape in cross section, comprising the web 22 of U or channel cross section and lateral flanges 23, bent oppositely from the top edges of the opposite side members of the web. As shown, the web 22 is downwardly inclined or tapered from the middle portion of the carline to the opposite ends thereof, at the angle adapted to impart the desired pitch to the roof; and, preferably, said web gradually diminishes in depth from its middle portion or horizontal portion 24 of the lateral flanges 23, to the opposite ends of the carline. The channel or web 22 is preferably of uniform or constant width from end to end of the carline. In order to compensate for the excess of metal in the middle portion of the channel or web, with respect to the end portions thereof, and to equalize the distribution of metal throughout the length of the carline, the lateral flanges 23 are tapered and gradually increase in width from the middle or apex of the carline to its opposite ends, the increase in metal in the lateral flanges towards the ends being proportionate to the decrease in metal in the web.

At the opposite ends of the web 22 and lateral flanges 23, the carline is formed with down-turned vertical flanges 25, adapted to engage the inner side faces of the side plates 26. The opposite ends of the carline are secured to the side frame members, such as the side plates 26, below the top faces of the said side plates; and, in order to strengthen and reinforce the parts at the points of attachment of the carline to said side plates, there are provided top or reinforcing plates. Referring to Figs. 1 to 5 inclusive, the top plates 27 are bent to form lower lateral webs 28 adapted to overlie and be secured by rivets 29 to the end portions of the lateral flanges 23, vertical webs 30 that project upwardly from the plane of the lateral flanges 23 at the ends thereof and which rest against and engage the inner side faces of the side plates 26, upper lateral webs 31 hung over the entire top faces of the side plates, and downwardly-turned flanges 32 resting against and engaging the outer side faces of the said side plates. The opposite ends of the carline are secured to the side plates 26 by bolts 33, respectively located on opposite sides of the channel or web 22 and passed through the down-turned flanges 25 and the side plates 26. With this construction, the supporting effect of the bolts 33, is supplemented and augmented by the top plates 27 hung over the top faces of the side plates 26.

In the form of the invention illustrated in Fig. 6, the top plate 27 is provided with an outwardly-turned flange 34 at the upper edge of its vertical web 30, which flange 34 is hung over the inner portion of the top face of the side plate 26.

The further modification of the invention illustrated in Fig. 7, shows the top plate 27 in the form of an angle plate, having its vertical web 35 secured to the side plate 26 by bolts 36, thereby providing an additional fastening for the end of the carline, but without the overhanging feature above set forth.

The carlines illustrated in the drawings may support, in the usual way, the ridge pole 37 and the purlins 38, these being bolted to the lateral flanges 23 of the carlines.

The invention as hereinabove set forth is embodied in a particular form of construction but may be variously embodied within the scope of the claims hereinafter made.

I claim:

1. In a carline construction, the combination with the side plates of a car roof frame; of a carline embodying a trough shaped rigidifying rib of constant width having sides decreasing in depth from the ridge portion toward each end, the upper edges of said sides terminating in outwardly extending lateral flanges increasing in width as the sides decrease in depth, and flanges at each end of the carline being downturned from said outwardly extending lateral flanges and outwardly turned from the sides of said trough shaped rigidifying rib and engaging and secured to the side plates below the top faces of the latter; and reinforcing plates overlying and secured to the outwardly extending lateral flanges of the trough shaped rigidifying rib and bent upwardly and engaging over the top faces of the side plates.

2. In a carline construction, the combination with the side plates of a car roof frame; of a cambered carline embodying a trough shaped rigidifying rib of constant width having sides decreasing in depth from the ridge portion toward each end, the upper edges of said sides terminating in outwardly extending lateral flanges increasing in width as the sides decrease in depth, and flanges at each end of the carline being downturned from said outwardly extending lateral flanges and outwardly turned from the sides of said trough shaped rigidifying rib and engaging and secured to the side plates below the top faces of the latter; and reinforcing plates overlying and secured to the outwardly extending lateral flanges of the trough shaped rib and bent upwardly and engaging over the top faces of the side plates.

JOHN W. BERNBAUM.